Dec. 31, 1935.　　G. WOLKENHAUER　　2,026,201
DISPLAY DEVICE
Filed Nov. 12, 1934　　3 Sheets-Sheet 1

INVENTOR.
Gustav Wolkenhauer
BY Threedy and Cannon
HIS ATTORNEYS.

Witness L. M. Hansen

Dec. 31, 1935.   G. WOLKENHAUER   2,026,201
DISPLAY DEVICE
Filed Nov. 12, 1934   3 Sheets-Sheet 2

INVENTOR.
Gustav Wolkenhauer
BY Threedy and Gannon
HIS ATTORNEYS.

Witness L. M. Hansen

Dec. 31, 1935.      G. WOLKENHAUER      2,026,201
DISPLAY DEVICE
Filed Nov. 12, 1934      3 Sheets-Sheet 3

Witness L. M. Hansen

INVENTOR.
Gustav Wolkenhauer
BY Threedy and Cannon
HIS ATTORNEYS

Patented Dec. 31, 1935

2,026,201

UNITED STATES PATENT OFFICE 2,026,201

DISPLAY DEVICE

Gustav Wolkenhauer, Chicago, Ill.

Application November 12, 1934, Serial No. 752,590

2 Claims. (Cl. 40—126)

This invention relates to a display device.

It is an object of this invention to provide an improved display device which is relatively simple and inexpensive in construction and efficient in use.

Another object of this invention is to provide a novel display or advertising device by means of which representations or simulations of vendible commodities such, for example, as beverages, including alcoholic drinks such as beer, and soft drinks, as well as other food products, and other articles may be attractively advertised and displayed to the public in such a realistic manner that the observer is caused to believe that he is actually viewing a specimen of the real vendible commodity itself rather than a mere representation or simulation of the same.

A further object of the invention is to provide a novel device which is particularly adapted for displaying or advertising vendible commodities which are sold or displayed in light penetrable or transparent containers; and to construct the new display device in such a manner that the high lights and shadows produced by natural light shining upon the vendible commodity itself may be reproduced to create the illusion in the mind of the observer that he is viewing an actual specimen of the vendible commodity itself therein rather than a mere simulation or representation of the same.

Other objects will appear hereinafter.

The invention consists in the novel combination and arrangement of parts to be hereinafter described and claimed.

The invention will best be understood by reference to the accompanying drawings, showing several forms in which the invention may be constructed and in which.

Figure 1:
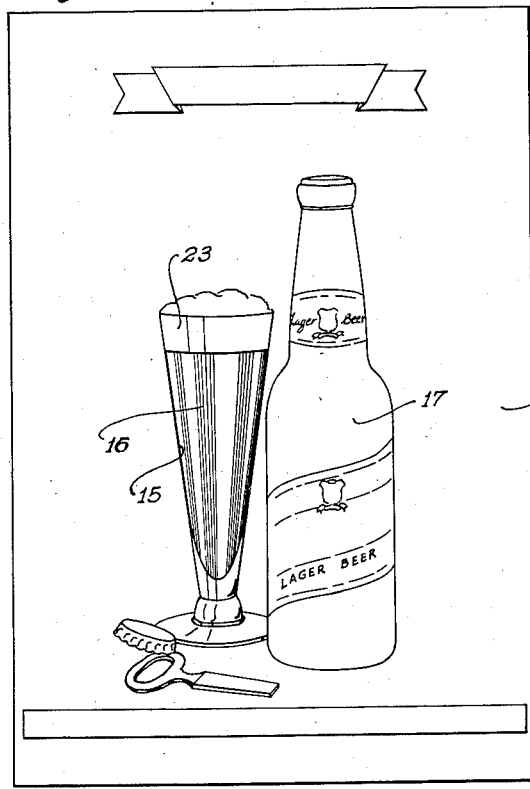
Fig. 1 is a front elevational view of a preferred form of the new advertising or display device.
Figure 2:
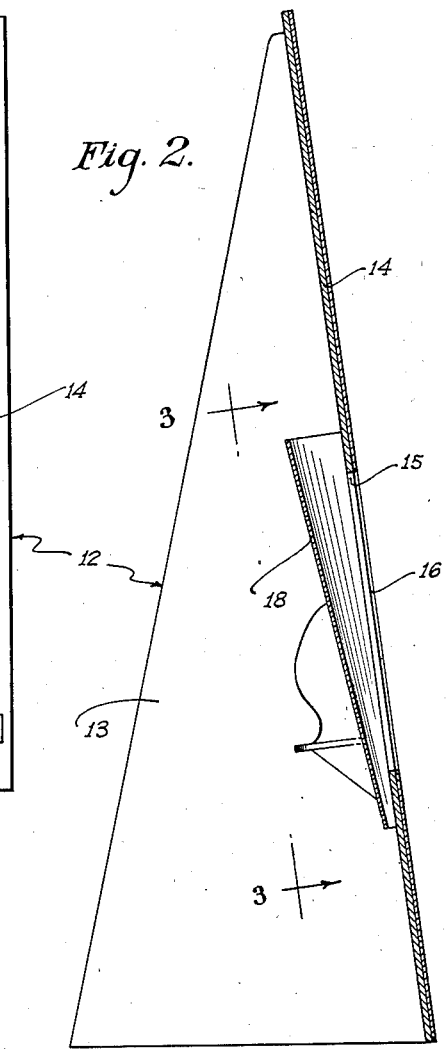
Fig. 2 is a vertical sectional view of the same on line 2—2 in Fig. 1.
Figure 3:
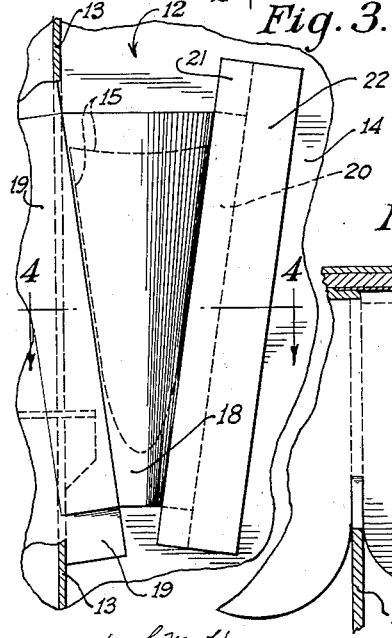
Fig. 3 is a fragmentary sectional view on line 3—3 in Fig. 2.

A preferred form of the new display or advertising device is illustrated in Figs. 1 to 4, inclusive, of the drawings, is therein generally indicated at 12, and comprises a support in the form of an easel 13 which includes a mounting 14, the mounting 14 having a slight inclination from the vertical in order that the observer's line of vision or focus may be substantially at a right angle thereto.

Formed in the mounting 14 of the easel support 13 is a cut-out opening 15 and arranged in this opening 15 and co-extensive therewith is a sheet 16 of light-penetrable material which is, preferably, transparent. In the form of the invention shown in Figs. 1 to 4, inclusive, this sheet 16 is made of amber colored "Cellophane" which aids in creating the illusion in the mind of the observer that he is actually viewing a real specimen of the vendible commodity indicated in the drawing rather than a mere simulation or representation of the same, and to enhance or increase this illusion, the representation 17 of a container for the commodity may be painted or otherwise provided on the mounting card 14 adjacent the amber-colored sheet 16.

Figure 4:
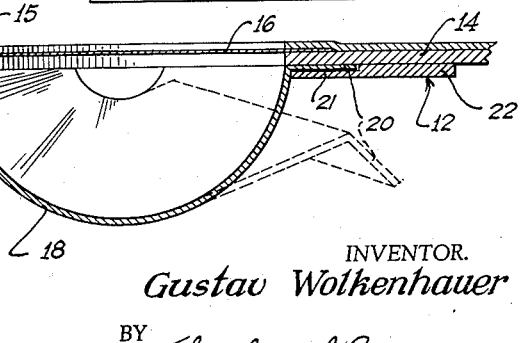
Fig. 4 is a sectional view on line 4—4 in Fig. 3.

The form of the new display or advertising device shown in Figs. 1 to 4 inclusive, includes a concave or equivalent reflector 18 which is substantially semi-circular in cross section (Fig. 4); one lateral edge portion 19 of this reflector 18 being fixedly attached to the mounting 14 at the rear thereof, and the other lateral edge portion 20 of the reflector 18 being removably attached to the mounting 14, as by being inserted into a channel or groove 21 provided therefor in a fastening strip 22 which is attached to the mounting 14 (Fig. 4).

In the use of the form of the new advertising or display device shown in Figs. 1 to 4, inclusive, of the drawings, the natural or other light in which the device itself is displayed penetrates the transparent sheet 16 from a point in front of the sheet 16 and the mounting 14, and upon passing through the sheet 16, strikes against the reflector 18 by which it is reflected back through the transparent sheet 16 to the observer; the reflective properties of the reflector 18 being enhanced or increased by its curvature (Fig. 2), which is, preferably, concave rearwardly, relative to the front face of the mounting 14, and by the provision of a light reflective coating upon the front surface of the reflector 18, this coating being, preferably, a bright, metallic coating which may be silver, aluminum or other metallic coating, or a non-metallic coating having the light-reflective properties of metal.

When an observer views the new display device, shown in Figs. 1 to 4 inclusive of the drawings, from the front of the same, the illusion is created in his eye that he is in reality viewing an actual specimen of the vendible commodity itself rather than a mere representation or simulation of the same; it being essential to note that the new display device creates this illusion to a large extent, because of the fact that it reproduces the natural high lights and shadows which are produced when natural or other diffused light strikes the actual vendible commodity itself; and it is also important to note that these natural high lights and shadows cannot be reproduced by means of a display device which employs or has incorporated into itself an auxiliary source of artificial light, as in certain prior art display devices, in which artificial light is directed vertically between a reflector and a sheet of glass.

Moreover, in the use of a display device which employs an auxiliary source of light, the illusion created by the natural high lights and shadows reproduced by the present display device is destroyed by the glare incidental to the use of an auxiliary source of light.

Moreover, in the present display device the natural high lights and shadows create the illusion that the transparent sheet 16 is a portion of a container or other object sought to be simulated having a considerable depth or body extending rearwardly of the plane of the transparent sheet 16 rather than lying substantially or entirely within the plane of the mounting card 14, as is actually the case.

The foregoing illusion may be further enhanced by the provision of the representation 17 upon the mounting 14, of a container for the vendible commodity which is being advertised and, in the illustration shown, by the representation of foam 23 upon the face of the mounting card 14 above the amber-colored sheet 16.

The lateral edge portion 20 of the reflector 18 may readily be slipped out of the groove or channel 20 (Fig. 4) and the reflector 18 and easel 13 collapsed substantially into parallelism with the mounting card 14 to facilitate packing and shipping the new display or advertising device.

Figure 5:
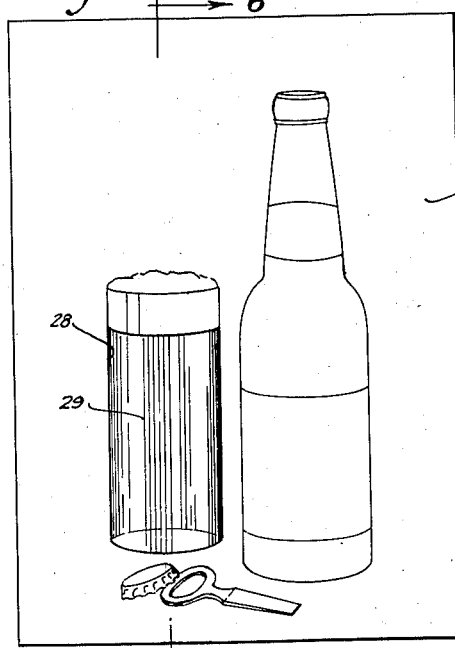
Fig. 5 is a front elevational view of a modified form of the new advertising or display device.
Figure 6:
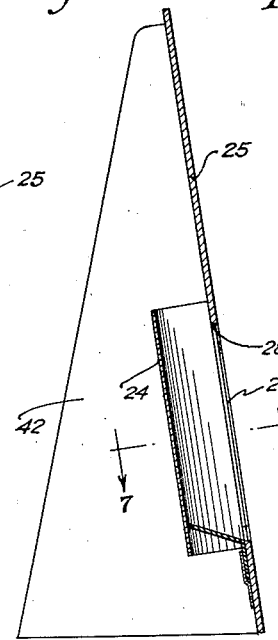
Fig. 6 is a sectional view on line 6—6 in Fig. 5.
Figure 7:
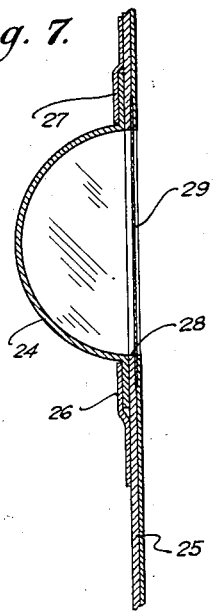
Fig. 7 is a sectional view on line 5—5 in Fig. 6.
Figure 8:
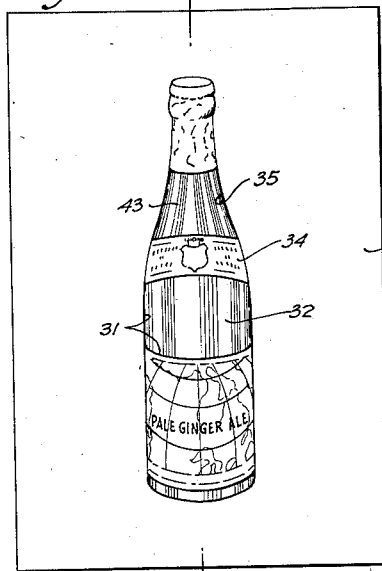
Fig. 8 is a front elevational view of another modified form of the new display or advertising device.

The modification of the invention shown in Figs. 5, 6 and 7, is substantially the same as that shown in Figs. 1 to 4 inclusive except that the reflector 24 is non-collapsibly attached to the mounting card portion 25 of the easel 42, rather than being collapsibly attached thereto, as in the form shown in Figs. 1 to 4; the reflector 24 being fixedly attached to the mounting 25 at the rear thereof by means of adhesively coated strips of paper 27 or in any other suitable manner.

The modification shown in Figs. 5, 6 and 7 likewise differs slightly from that shown in Figs. 1 to 4 inclusive in the shape of the cut-out opening 28 formed therein as well as in the corresponding shape of the amber-colored "Cellophane" sheet 29 which is arranged in the opening 28.

Another modification of the invention is shown in Figs. 8 to 11 inclusive and this form of the invention is particularly adapted for advertising or displaying vendible commodities such, for example, as beverages and other food products which are sold in long-necked green bottles.

This form of the invention comprises an easel suppport 41 which includes a mounting card 30, the easel 41 being similar to the easel mountings 14 and 25; this mounting 30 having a cutout opening 31 formed therein in which is arranged a sheet 32 of green-colored "Cellophane'" or equivalent transparent material.

The opening 31 and the green "Cellophane" sheet 32 arranged therein are shaped to represent the body of a long-necked green bottle (Fig. 8), and arranged in the opening 31, behind the sheet 32, and adhesively or otherwise secured to the rear surface of the mounting 30, is a sheet 33 of amber-colored "Cellophane" or equivalent transparent material, the opening 34 and the sheet 35 being shaped to represent the neck of a long-necked bottle.

Figure 11:
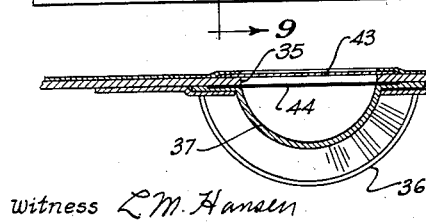
Fig. 11 is a horizontal sectional view on line 11—11 in Fig. 10.

Formed in the mounting card 30, above the opening 31, and separated therefrom by a transverse web portion 34 of the mounting card 30, is a second opening 35, and arranged in this opening 35 are green and amber-colored sheets 43 and 44, respectively, which are arranged one behind the other in the order named in the same manner that the sheets 32 and 33 are arranged in the opening 31 (Fig. 11).

Figure 9:
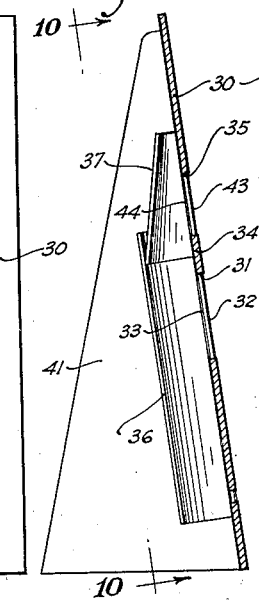
Fig. 9 is a sectional view on line 9—9 in Fig. 8.
Figure 10:
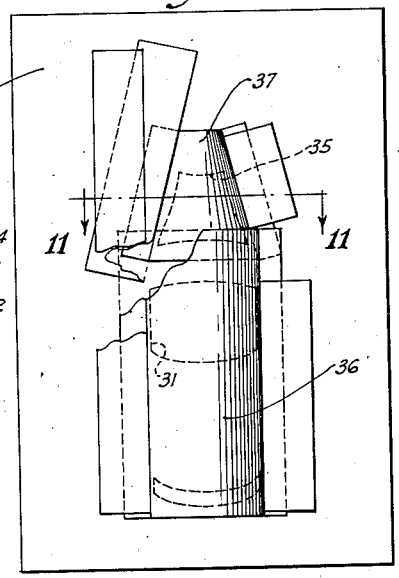
Fig. 10 is a rear elevational view on line 10—10 in Fig. 9.

Attached to the mounting card 30 behind the opening 31 is a reflector 36, which is similar to the reflectors 18 and 24, and attached to the mounting card 30 behind the opening 34 and sheet 35 is a reflector 37 which is substantially half of a frusto-cone in cross section (Figs. 9 and 11).

When the display or advertising device of Figs. 8 to 11 is in use, the light in which it is displayed will penetrate through the green "Cellophane" or equivalent transparent sheet 32 and through the amber-colored sheet 33, from a point in front of the mounting card 30 (to the right, Fig. 9) and, upon striking the reflector 36 will be reflected back through the transparent sheets 33 and 32 to create the illusion that the observer is actually viewing the body of a green bottle filled with a beverage or other liquid substance. This illusion is enhanced by the amber colored "Cellophane" sheet 35 and by the frusto-conical reflector 37 which cooperate to create the natural high lights and shadows which are seen when a green or other colored bottle or like transparent container filled with liquid is exposed to diffused light.

Thus the observer, viewing the green "Cellophane" sheets 32 and 43 is given the impression that he is viewing a long-necked green bottle filled with a beverage or other liquid, and the foregoing illusion is further enhanced by the fact that the amber sheets 33 and 44, and the peculiar curvature of the reflector 37, create a relatively dark area or shadow behind the green sheets 32 and 43, giving the observer the impression that the simulated bottle is filled with liquid and not empty, which is the impression created if the green transparent sheets 32 and 43 are used alone without the amber sheets 33 and 44.

Figure 12:
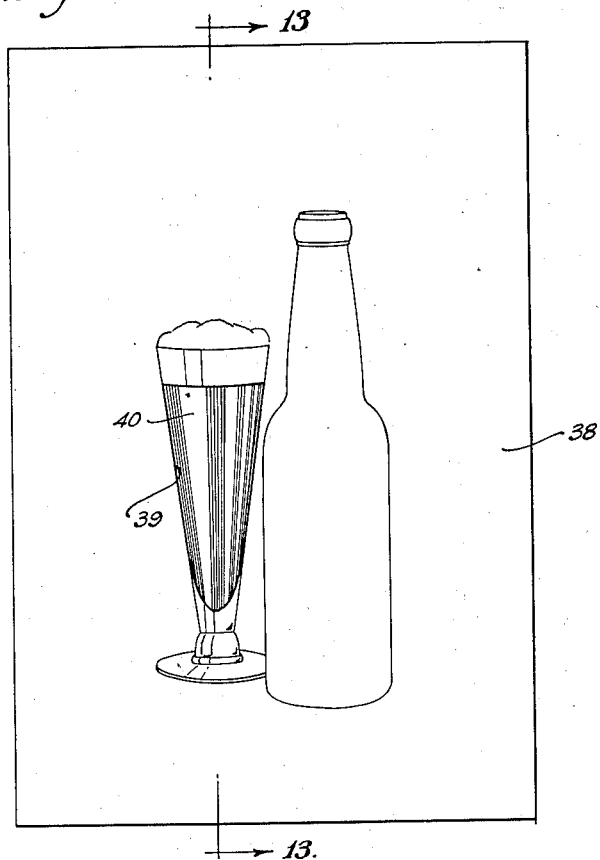
Fig. 12 is a front elevational view of a further modification of the invention.
Figure 13:
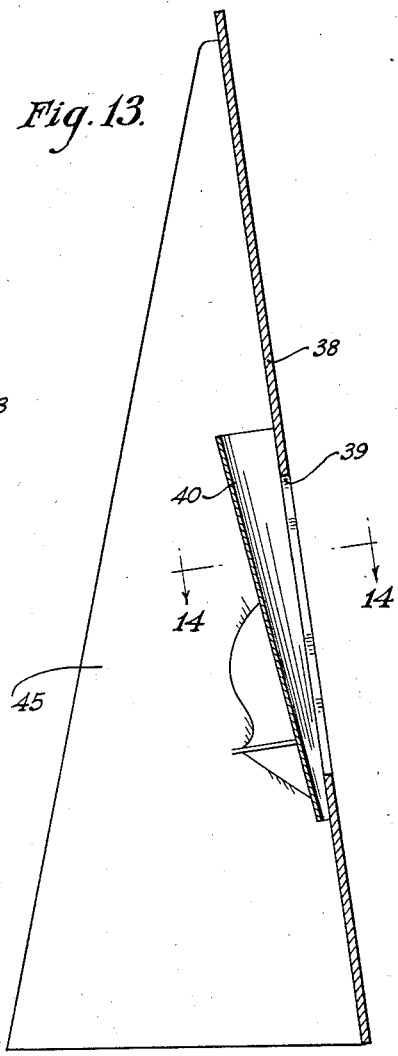
Fig. 13 is a sectional view on line 13—13 in Fig. 12.
Figure 14:
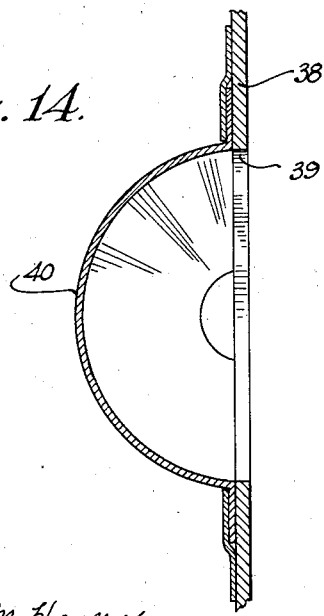
Fig. 14 is a sectional detail view on line 14—14 in Fig. 13.

The modification of the invention shown in Figs. 12 to 14 inclusive, includes an easel 45 and the latter includes a mounting card 38 which is similar to the mountings 14, 24, and 30 and has an opening 39 formed therein; a reflector 40 being attached to the mounting 38 behind the opening 39. This reflector 40 is similar to the collapsible reflector 18. In this form of the invention, however, the colored transparent "Cellophane" or equivalent sheet is omitted from the opening 39 and in lieu thereof the desired color of the vendible commodity which is being advertised or displayed, and which it is sought to simulate, is provided upon the reflector 40 by incorporating the same into the reflective coating with which the concave face of the reflector 40 is provided.

In this form of the invention light from a point in front of the opening 39 and mounting 38 passes directly through the opening 39 in the mounting 38 against the reflector 40 and, upon striking the reflector 40, is reflected by the latter back through the opening 39 to the eye of the observer; thereby creating in the eye of the observer the illusion that he is viewing an actual specimen of the vendible commodity advertised or displayed rather than a mere simulation or representation of the same.

The several forms of the new advertising or display device shown in the drawings are all inexpensive in construction, and may readily be placed in any store window or other display space where natural or artificial light is available; it being essential to note that none of the several forms of the new display or advertising device shown requires or includes as a part of its construction an auxiliary source of light, such as is employed in certain prior art display devices, and yet they all create a more realistic illusion than is possible with devices which employ an auxiliary source of artificial light arranged above or below the reflector, since the present display device eliminates the unnatural color and glare produced when an auxiliary source of artificial light strikes the reflector, and at the same time reproduces the desired natural high lights and shadows.

While the several forms of the invention illustrated in the drawings have been shown and described as used for the purpose of advertising and displaying beverages, it is to be understood that the invention is not limited to use for that particular purpose alone but may be used for the purpose of advertising or displaying vendible commodities or other objects, in general, and is particularly adapted to be used for the purpose of advertising or displaying food products and the like.

While I have illustrated and described the preferred forms of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A device for advertising commodities vended in long-necked bottles, comprising an upright support having the representation or picture of a bottle thereon and having an opening formed therein within the confines of said representation of a bottle; a sheet of light-penetrable material in said opening; a reflector attached to said support behind said opening and said reflector having substantially the form of a half cylinder; said support having a second opening formed therein likewise within the confines of the said representation of a bottle and above said first-named opening and spaced therefrom; a sheet of light-penetrable material in the said second-named opening; and a reflector attached to said support behind the said second-named opening and the said second-named reflector having substantially the form of half of a frusto-cone and having its lower and relatively larger end portion extending or depending into the said first-named reflector, said reflectors reflecting light through said sheets in such a manner as to simulate the reflection of light from the surface of a long-necked bottle.

2. A device for advertising commodities vended in long-neck bottles, comprising an upright support having the representation or picture of a bottle thereon and having an opening formed therein within the confines of said representation of a bottle; a reflector attached to said support behind said opening and said reflector having substantially the form of a half cylinder; said support having a second opening formed therein within the confines of the said representation of a bottle and above said first-named opening and spaced therefrom; a reflector attached to said support behind the said second-named opening and said second-named reflector having substantially the form of half of a frusto-cone and having its lower and relatively larger end portion extending or depending into the said first-named reflector, said reflectors reflecting light through said openings in such a manner as to simulate the reflection of light from the surface of a long-necked bottle.

GUSTAV WOLKENHAUER.